(No Model.)
G. D. BURNS.
HOSE CLAMP.
No. 583,454. Patented June 1, 1897.
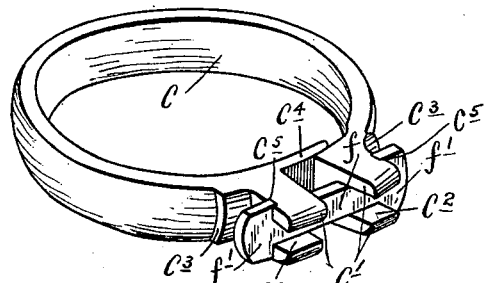
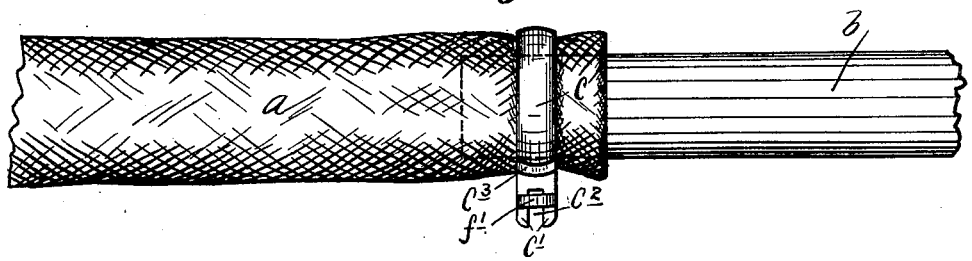
Witnesses.
Harry Kilgore
A. D. Merchant
Inventor.
George D Burns,
By his Attorney.
Jas. T. Williamson
THE NORRIS PETERS CO., PHOTO-LITHO., WASHINGTON, D. C.

UNITED STATES PATENT OFFICE.

GEORGE D. BURNS, OF MINNEAPOLIS, MINNESOTA.

HOSE-CLAMP.

SPECIFICATION forming part of Letters Patent No. 583,454, dated June 1, 1897.

Application filed July 9, 1896. Serial No. 598,578. (No model.)

*To all whom it may concern:*

Be it known that I, GEORGE D. BURNS, a citizen of the United States, residing at Minneapolis, in the county of Hennepin and State of Minnesota, have invented certain new and useful Improvements in Hose-Clamps; and I do hereby declare the following to be a full, clear, and exact description of the invention, such as will enable others skilled in the art to which it appertains to make and use the same.

My invention has for its object to provide an improved hose-clamp for securing rubber or flexible hose to pipes or to the nipple ends of other devices.

To this end my invention comprises the novel devices and combinations of devices hereinafter described, and defined in the claims.

My invention is illustrated in the accompanying drawings, wherein, like letters referring to like parts throughout the several views—

Figure 1 is a perspective view showing the preferred form of my improved hose-clamp removed from working position, and Fig. 2 is a plan view showing the hose-coupling applied to hold a hose to the end of a pipe.

$a$ indicates a rubber hose, and $b$ a metallic pipe.

In my improved hose-clamp I employ a broken or sectioned ring—that is, a ring which is provided with ends which are adapted to be drawn together. The ends of this ring are provided with projections, and a lock-piece, which is provided with suitable engaging surfaces, is placed over these projections while the ring is tightly clamped onto the hose and thereby caused to hold the said ring tightly clamped onto said hose. In the construction shown the ring $c$ is provided at its ends with lugs $c'$, which lugs are slotted, as shown at $c^2$. The ring $c$ is also preferably provided with shoulders $c^3$, formed on the outer surfaces of the ends of the same, on opposite sides of the lugs $c'$, and one end of said ring is provided with an extension or lip $c^4$, which overlaps the inner surface of the opposite end. The lock-piece employed in this construction is formed by a small bar or key $f$, provided with T-heads $f'$. When placed in working position, the bar $f$ is placed in the slots $c^2$ of the lugs $c'$, with its heads $f'$ embracing the opposite sides of the pair of lugs $c'$. Preferably the lugs $c'$ are provided with very shallow notches $c^5$, into which the heads $f'$ fall when placed in working position and by which the key is more firmly held from displacement.

In placing the clamp in working position on a hose and pipe, as shown in Fig. 2, the ring $c$ should first be placed around the hose after the hose has been slipped onto the end of the pipe or nipple, and then the ring may be tightly clamped onto the hose by placing the lugs or shoulders $c^3$ between the jaws of a vise or similar device. When thus pressed onto the pipe, the key $f$ may be readily placed in working position, as shown. Then upon loosening the jaws of the vise the expansion of the hose will cause the lugs $c'$ to tightly press against the heads $f'$ of said key and hold the same in position. When thus secured in working position, the key will firmly hold the ring clamped against the hose and the hose clamped onto the pipe or nipple, and the said key cannot be displaced or loosened by any amount of jarring or rattling, such as is encountered in railway service. However, by clamping the shoulders $f^3$ in a vise the key may be as readily removed as it was placed in working position.

Obviously a hose-clamp constructed in accordance with my invention is extremely serviceable for many other uses than those above enumerated. It is also evident that various alterations in the details of construction above set forth may be made without departing from the spirit of my invention.

What I claim, and desire to secure by Letters Patent of the United States, is as follows:

1. A hose-coupling involving the sectioned ring $c$, formed at its ends with the slotted lugs $c'$, $c^2$ and the key $f$ with the T-heads $f'$ adapted to be sprung over the lugs $c'$, substantially as described.

2. In a hose-coupling, the combination with the sectioned ring $c$, formed at its ends with the slotted lugs $c'$, $c^2$, provided with the shallow notches $c^5$, of the key $f$ with T-heads $f'$ adapted to be seated in the said shallow notches $c^5$, substantially as described.

3. In a hose-coupling, the combination with the ring $c$, formed at its sectioned ends with the shoulders $c^3$ and the slotted lugs $c'$, $c^2$ provided with shallow notches $c^5$, of the key $f$ with the T-heads $f'$ adapted to be seated in the said shallow notches $c^5$, substantially as described.

In testimony whereof I affix my signature in presence of two witnesses.

GEORGE D. BURNS.

Witnesses:
   HARRY KILGORE,
   F. D. MERCHANT.